APPARATUS TO MONITOR SPLICE IMPEDANCE AND CONNECTION POLARITIES INCLUDING MEANS TO PROVIDE CONTINUOUS SIGNAL TRANSMISSION DURING CABLE TRANSFER OPERATIONS

Filed Dec. 22, 1964 2 Sheets-Sheet 1

INVENTORS I. M. MC NAIR, JR.
N. A. STRAKHOV
C. A. YOUNG
BY John K. Mullarney
ATTORNEY APPARATUS TO MONITOR SPLICE IMPEDANCE AND CONNECTION POLARITIES INCLUDING MEANS TO PROVIDE CONTINUOUS SIGNAL TRANSMISSION DURING CABLE TRANSFER OPERATIONS Filed Dec. 22, 1964 2 Sheets-Sheet 2

United States Patent Office 3,344,348

Patented Sept. 26, 1967

3,344,348

APPARATUS TO MONITOR SPLICE IMPEDANCE AND CONNECTION POLARITIES INCLUDING MEANS TO PROVIDE CONTINUOUS SIGNAL TRANSMISSION DURING CABLE TRANSFER OPERATIONS

Irving M. McNair, Jr., Scotch Plains, Nicholas A. Strakhov, Chatham, and Charles A. Young, Scotch Plains, N.J., assignors to Bell Telephone Laboratories, Incorporated, New York, N.Y., a corporation of New York Filed Dec. 22, 1964, Ser. No. 420,417

12 Claims. (Cl. 324—66)

ABSTRACT OF THE DISCLOSURE

A test set to facilitate the transfer of telephone service from one multiconductor cable to another multiconductor cable provides an auxiliary transmission path, during the splicing operations connecting the one cable to the other, by bridging the new and old cable pairs during the splicing operation. The test set identifies the tip and ring connections of the new cable by comparing the phase of a signal applied to a particular conductor pair of the new cable and detected at the corresponding conductor pair of the old cable. The impedances of the splices of the tip and ring leads are utilized to control threshold circuits controlling indication apparatus which is rendered inoperative if the impedances of the splices exceed some minimum value.

Figure 1A:
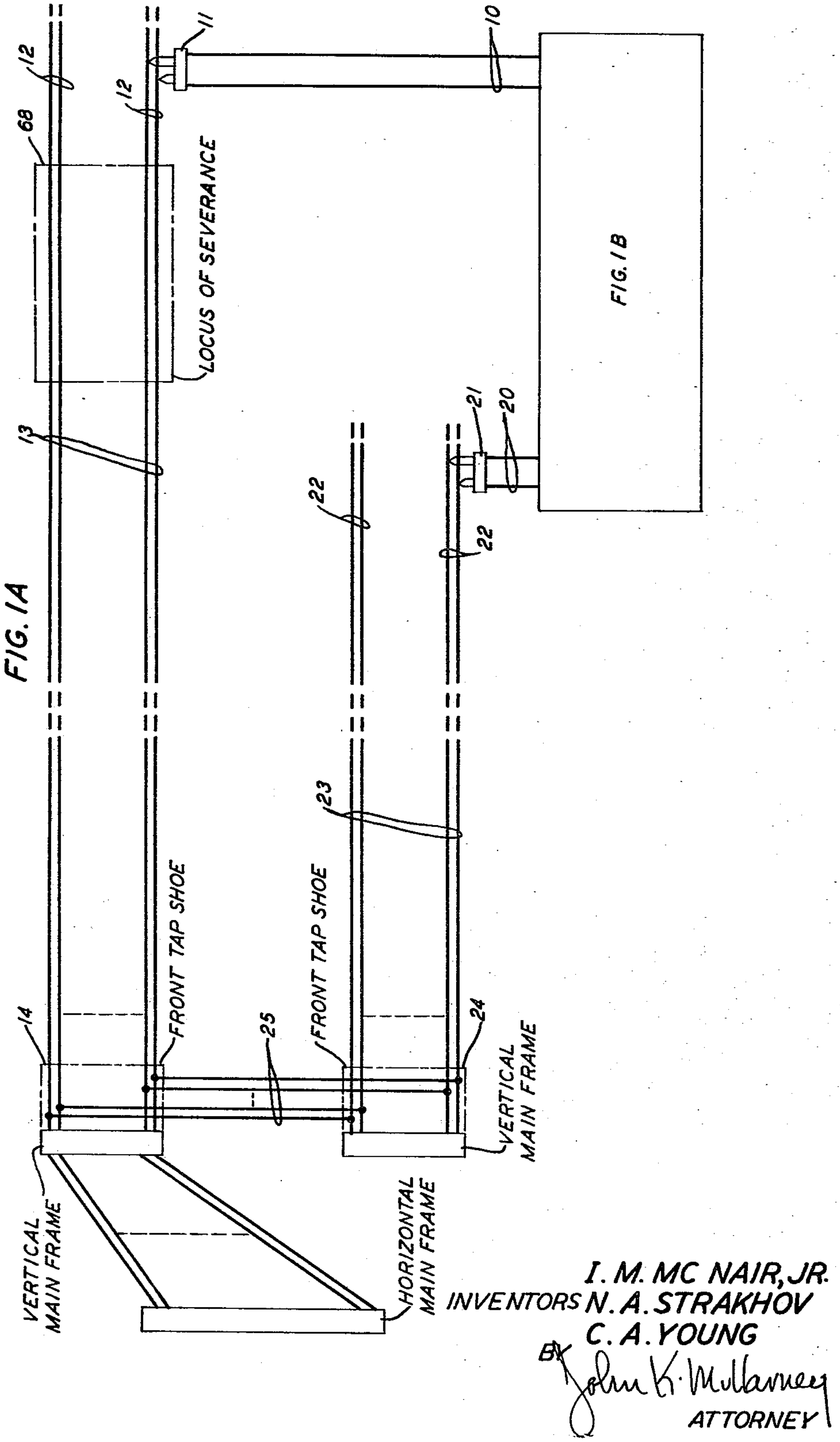

This invention relates to apparatus to facilitate the tranfer and replacement of multiconductor telephone cables and, more particularly, to apparatus to identify the individual conductors of corresponding cable pairs and test the quality of the splicing of the replacement cable.

A telephone cable, used to connect subscribers from some remote location to a central office, is generally made up of a large number of insulated pairs of conductors which are twisted together. The individual leads of the conductor pairs are designated tip and ring. These conductor pairs are all contained within a single protective sheath. Each of the conductor pairs connects a particular subscriber to a terminal on a mainframe at the central office.

It is frequently necessary to replace one of the multiconductor cables which connect some central office with subscribers connected to branch multicondutcor cables located some distance from the central office. Such a replacement may be necessitated by deterioration of the cable in present use or because of a need for increased capacity due to growth of customer service.

In the past the procedure utilized in effectuating the replacement of a multiconductor cable has involved a series of time consuming operations. In a typical cable replacement operation the conductor pairs of the existing and replacement cables are connected in parallel at the mainframe in the central office. A workman at the field location of the cable transfer strips the sheath of the existing cable to gain access to the conductor pairs therein.

The workman identifies the corresponding conductor pairs of the existing and replacement cables by applying an audible signal at the splice location of the existing cable and recovering that signal on the replacement cable. Each conductor pair as tested must be examined before the sending of the signal to see if it is in use so that the audible signal will not be applied to a conductor pair in subscriber use. The ring side of the paired conductors is determined by having a workman at the central office send a low frequency signal over the ring side of each conductor pair which signal is detected by the workman at the field location.

When the idenitfication is completed the actual transfer process is performed by cutting the conductor pairs of the existing cable and splicing in the corresponding conductor pairs of the replacement cable. During the splicing time increment the particular conductor pair is disabled from subscriber service.

It is easily surmised that the above cable replacement operation is unwieldy and far from efficient in requiring the workman to individually handle each conductor pair at least three separate times in three distinct operations. In addition, when the existing conductor pair is severed for the splicing operation circuit continuity is destroyed, thereby interrupting subscriber service for a substantial time period. Thirdly, the quality of the splice is not determined unless the circuit is removed from subscriber service for a still longer time period to conduct tests thereon.

It is therefore an object of the present invention to permit the replacement of one multiconductor cable by another in telephone systems without an interruption of service to the subscriber.

It is yet another object of the present invention to automatically identify the tip and ring conductors of corresponding conductor pairs as an integral part of a continuous splicing operation without the need of a special operation requiring a workman at the other end of the cable.

It is still another object of the present invention to automatically check the impedance and proper tip and ring connection of the splice in connecting the replacement cable as the splice is being completed without the necessity of additional testing.

In accordance with the present invention the replacement of one multiconductor cable by another is accomplished as one operation with a test apparatus which permits the entire transfer operation to be accomplished without the interruption of customer service. The conductor pairs of the existing and replacement cable are connected in parallel at the central office by placing front tap shoes on the connections of both the original and replacement cables and electrically bridging the two shoes together.

The workman at the field location cuts away the sheath of the existing cable to gain access to the conductor pairs therein. The test apparatus has a pair of two terminal clips. Each clip is designed to make metallic connection with and be attached to both the tip and ring sides of a conductor pair. The workman attaches one clip to an exposed conductor pair on the existing cable. A high frequency signal above the audible range is applied to that conductor pair by the test apparatus and the workman utilizes this signal to locate the corresponding conductor pair of the replacement cable using a separate high frequency receiver with an electronic probe. The other two terminal clip of the test apparatus is then attached to the corresponding conductor pair of the replacement cable, forming thereby a continuous closed circuit loop.

The test set applies a low frequency signal to the circuit loop through one of the clips. This signal is detected with the other clip. The test apparatus compares the phase of one low frequency signal as applied by one clip and detected by the other. If both clips are connected with the same polarity to the respective tip and ring sides of the corresponding conductors as indicated by the phase comparison, the test apparatus generates an output signal to notify the workman.

The workman severs the conductor pair of the existing multiconductor cable in order to splice in the conductor pair from the replacement cable. During the interval of the severance of the conductor pair of the existing cable and the splicing in of the conductor pair of the replacement cable, the test apparatus provides an auxiliary circuit path for subscriber signals. This auxiliary circuit path connects the replacement cable to the part of the existing cable which is to remain in service so that service to the subscriber will not be interrupted. As the workman splices in the replacement conductor pair the generated output signal of the test apparatus is modified for each individual tip and ring splice to indicate that a correct low impedance splice has been made.

It can be seen from the foregoing that a particular advantage of the test apparatus is that it permits the transfer of service from one multiconductor cable to another without any interruption of subscribed service.

Figure 1B:
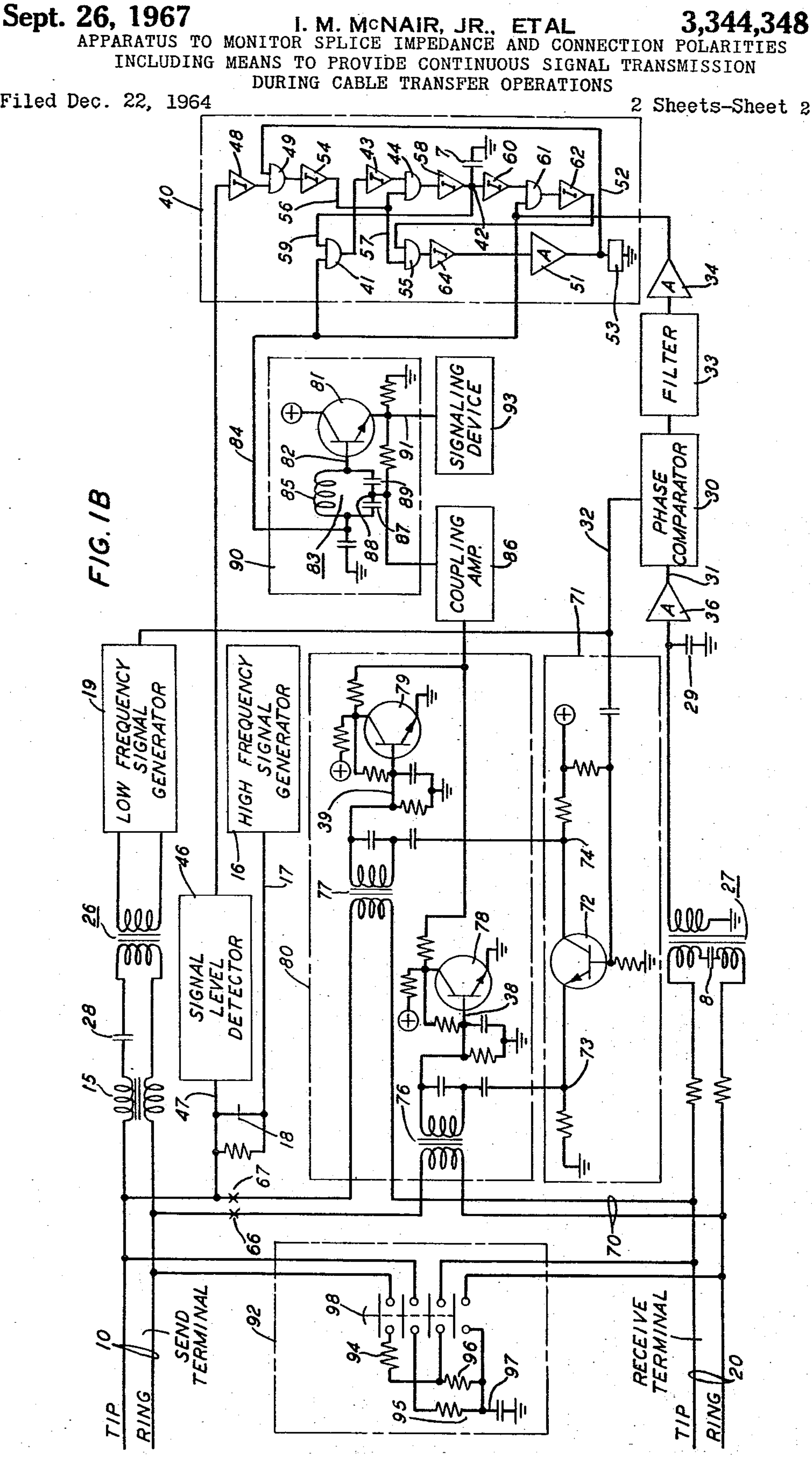

Various additional features and advantages will be readily apparent in the following detailed description of an illustrative embodiment of the invention wherein:

FIGS. 1A and 1B represent a schematic circuit diagram of an illustrative embodiment of the invention.

Referring more particularly to the figures, the test apparatus has two test lead conductors 10 and 20 emanating from the test apparatus. Each of the test lead conductors 10 and 20 terminates in a two terminal clip 11 and 21, respectively. The clips 11 and 21 make metallic connection to the conductor pairs 12 and 22 by piercing the insulation thereon.

Before the application of the test set the replacement cable 23 and the existing cable 13, both connecting a central office with some field location, have been connected in parallel at the central office mainframe. Front tap shoes 14 and 24 are placed on the vertical mainframe termination of each of the cables and are bridged, via the conductors 25, connecting corresponding conductor pairs in parallel. The front tap shoes are well known in the telephone art. A suitable type of tap shoe is disclosed for instance in United States Patent 3,275,971 of J. H. King, issued Sept. 27, 1966.

At the field location, the workman removes the outer sheath of the existing cable 13 to gain access to all of the conductor pairs 12 contained therein. The workman attaches the two terminal clip 11 to one of the exposed conductor pairs 12 therein of the existing cable 13. Referring to FIG. 1B, a signal generator 16 applies an ultrasonic signal, via lead 17 and relay contact 18, to the tip side of the test lead conductor 10. This signal is applied by the two terminal clip 11 to the exposed conductor pair 12 of the existing cable 13.

The conductor pairs 12 and 22 of the two cables 23 and 13 that are to be substituted are paralleled together at the central office. The conductor pair 22, of the replacement cable 23, corresponding to the conductor pair 12, of the existing cable 13, is determined by locating the particular conductor pair 22 carrying the high frequency signal which is applied to one of the conductors pairs 12. The test apparatus has no circuitry to detect the high frequency signal. This detection operation must utilize auxiliary apparatus to detect the transmitted signal to identify the corresponding conductor pair. The signal generator 16 may comprise an oscillator circuit capable of producing an ultrasonic signal somewhat above the audio range. This signal will preferably be of low harmonic content and constant output level to minimize possible interference with subscriber use of the line. It is not believed necessary to describe the signal generator 16 in detail since many oscillators well known in the art may be equally well used.

A low frequency signal generator 19 generates a signal below the audio threshold which for illustrative purpose is considered to be a 50 c.p.s. signal. This signal is applied to the test lead conductor 10, via a coupling transformer 26. The series connected inductor 15 and capacitor 28 included in test lead conductor 10 are resonant to a frequency of 50 c.p.s. This resonant circuit is inserted herein to minimize possible interference with subscribers using the conductor pairs 12 and 22 by presenting a high impedance output to the signal generator 19.

The 50 cycle signal is applied to the conductor pair 12 of the existing cable 13 to which the two terminal clip 11 is attached. The 50 cycle signal is transmitted, through the conductor pair 12 of the existing cable 13, the paralleled front tap shoes 14 and 24 and via the corresponding conductor pair 22 of the replacement cable 23 and from thence to the two terminal clip 21, which is connected to the corresponding conductor pair 22 at the field location. The 50 cycle signal detected by the two terminal clip 21 is transmitted, via a coupling transformer 27, to an amplifier circuit 36. A capacitor 8 is included in the primary winding of transformer 27 to attenuate extraneous alternating current signals. A capacitor 29 is shunted across the input to the amplifier 36 to further attenuate extraneous high level high frequency signals which may possibly saturate the amplifier 36.

The amplifier 36 amplifies the 50 cycle signal and applies it to a phase comparison circuit 30, via lead 31. The low frequency signal generator 19 applies its output signal, via lead 32, to another input of the comparison circuit 30. The comparison circuit 30 generates a signal which is equal to the product of the two input signals applied to it on leads 31 and 32. If these two signals are 180 degrees out of phase, as they would be if the tip and ring sides of the corresponding conductor pairs 12 and 22 are reversed in their connection to the test apparatus, the comparison circuit will generate a signal with a direct current component of one polarity. If the two signals are in phase, the output signal will contain a direct current component of the opposite polarity. Comparison circuits of this nature are available in the art and it is not believed necessary to disclose one in detail. The output of the comparison circuit 30 is applied to a filtering circuit 33 to remove the alternating current components of the comparison signal generated. The direct current component of the comparison signal is applied to a direct current amplifier circuit 34. The direct current amplifier 34 may be a differential type amplifier arranged to generate a direct current output signal responsive to only the polarity of input indicative of phase coincidence of the transmitted and received signal. Such amplifier circuits are well known in the art and it is not believed necessary to disclose it in detail.

The output of the direct current amplifier 34 applies a postive signal, which may be considered to represent a binary "1," to the logic circuit 40. The logic circuit comprises convential AND gates and inverter circuits which are well known in the art.

The binary "1" is applied to one of the inputs of the AND gate 41. Assuming that a previous cable splice was completed successfully, the present state of the logic circuit 40 is such that a signal representing a binary "0" exists at the node 42. This signal represents the present state of the logic circuit. This binary "0" is applied to the other input of AND gate 41. Since the two signals applied to AND gate 41 are not in coincidence, the output signal of the AND gate 41 is representative of a binary "0."

An inverter circuit 43 converts this signal to one representing a binary "1." This signal is applied to one of the inputs of the AND gate 44.

A level detector 46 which may be an amplifier circuit responsive to some predetermined signal threshold is connected, via lead 47, to the tip side of the test lead conductor 10. The level detector 46 is tuned to the frequency of the high frequency signal generator 16 and is designed to generate a direct current output signal when the threshold of that particular high frequency signal as detected exceeds a certain minimum level. Since the high frequency signal output of the signal generator is being applied initially, via the relay contact 18, directly to the input of the level detector 46, the level detector generates an output signal representative of a binary "1" which is indicative of the sustained level of the high frequency signal.

An inverter circuit 48 converts this binary "1" to a binary "0" which is applied to one of the inputs of the AND gate 49. The present state of the output of the amplifier circuit 51 is applied, via lead 52, to the other input of AND gate 49. As the relay 53 is presently unenergized, the signal output of the amplifier 51 is a binary "0." Since the two inputs to the AND gate 49 are both opposite binary signals representative of a binary "0" and a binary "1," respectively, the output of the AND gate 49 is similarly a signal representative of a binary "0." An inverter circuit 54 converts this signal to one equivalent to a binary "1." This signal is applied, via lead 56, to one of the inputs of the AND gate 55.

The signal on lead 56 is also applied, via lead 57, to one of the inputs of AND gate 44. This signal in combination with the signal applied from the inverter circuit 43 to the other input permits the AND gate 44 to transmit a signal representing a binary "1." This signal is converted by the inverter circuit 58 to a signal representing a binary "0." This signal, which represents the unchanged state of the logic circuit 40 at node 42 is applied, via lead 59, to the other input of the AND gate 41, maintaining the equilibrium of the circuit, until the relay 53 operates. A capacitor 7 connects node 42 to ground. The function of this capacitor 7 is to delay signals to permit positive sequential operation of the logic circuitry.

The signal output of inverter circuit 58 is converted by inverter circuit 60 to one representative of a binary "1" and is applied to one of the inputs of the AND gate 61. The signal output of the amplifier 34 representative of a binary "1" is also applied to the other input of the AND gate 61. Since both inputs are signals representing the binary "1," the output of AND gate 61 represents a binary "1." This signal is converted by the inverter circuit 62 to one representative of a binary "0" and is applied to one of the inputs of the AND gate 55.

The signal outputs of inverter circuit 62 and the signal output of inverted circuit 54 are simultaneously applied to the AND gate 55. As the signals are of opposite polarity the AND gate 55 transmits a signal representing a binary "0." An inverter circuit 64 converts this signal to one representative of a binary "1." This signal is utilized by the amplifier 51 to operate the relay 53.

The operation of the relay 53 causes the closing of the two relay contacts 66 and 67. This completes an alternate circuit path 70 for subscriber signals after the particular conductor pair 12 in the original existing cable 13 has been severed by the workman in the locus of severance 68. The workman at the field location may now cut the conductor pair 12 of the existing cable 13 to facilitate the splicing operation. The relay 53 remains energized for the duration of the splicing operation. This stable condition may easily be verified by examining the stability of the state of the logic circuit 40 subsequent to the operation of the relay 53. Once the relay 53 has operated, a signal representative of a binary "1" is applied, via lead 52, to one of the inputs of AND gate 49. The operation of the relay 53, by operating the relay contact 18, has attenuated the output of the signal generator 16 as applied to the level detector 46. The level detector 46 in response to the drop in input emanates an output representation of a binary "0." This is converted by the inverter circuit 48 to a signal representative of a binary "1" which is applied to the other input of the AND gate 49.

The output of the AND gate 49 is a signal representative of a binary "1." This signal is converted by the inverter circuit 54 to a signal representative of a binary "0." The binary "0" is applied, via lead 56, to one of the inputs of each of the AND gates 44 and 55. The input signal to the other input lead of the AND gate 44 remains representative of a binary "1" since the output of the amplifier 34 has remained unchanged. The output of the AND gate 44, as converted by the inverter circuit 58, is a signal representative of a binary "1" which represents a new state of the logic circuit. The signal converted by inverter circuit 60 to one representative of a binary "0" is applied to one of the inputs of AND gate 61. Hence, a signal representative of a binary "1" is applied by the inverter circuit 62 to the other input of the AND gate 55. The two input signals respectively differing the output of AND gate 55 is representative of a binary "0." This signal converted by the inverter circuit 64 to a binary "1" maintains the continued operation of the relay 53. The logic circuit 40 now being in a stable condition the relay 53 will continue to be energized for the duration of the signal output of the amplifier 34, unless the workman has accidentally shorted a tip and ring conductor, thereby attenuating the 50 c.p.s. signal below a working level. Normally, the signal output of amplifier 34 will continue to be applied even after the existing conductor pair 12 is severed because the 50 cycle signal will be continuously applied to the comparison circuit 30, via the auxiliary transmission path 70.

The individual tip and ring sides of the auxiliary transmission path 70 are connected, via the primary windings of the coupling transformers 76 and 77, respectively, to a splice checking circuit 80. The splice checking circuit 80 monitors the impedance of the splice connecting the replacement conductor pair 22 to the existing conductor pair 12. The secondary windings of the coupling transformers 76 and 77 are respectively included in the base leads of the transistors 78 and 79. The base leads of each of the transistors 78 and 79 are ultimately connected to a phase splitter circuit 71. The phase splitter circuit 71 comprises a transistor amplifier 72 driven into conduction by the 50 cycle signal from the low frequency signal generator 19 applied to its base electrode 73. Two separate outputs are taken from the emitter and collector electrodes 73 and 74, respectively. Each of these separate outputs comprises a signal having a frequency of 50 cycles and being 180 degrees out of phase with each other. These distinct outputs are applied individually to the base electrodes 38 and 39 of the transistors 78 and 79, respectively.

The transistors 78 and 79 are biased such that the reflected impedance of the primary winding transferred to the secondary winding when the existing conductor pair 12 is severed is sufficient to prevent either of the respective transistors from entering the conducting region unless the replacement and existing conducting pairs are spliced together. As the replacement tip and ring side cables are spliced together with the existing cable the respective impedance of the primary winding circuits of the transistors 78 and 79 are substantially reduced. This reduced impedance transformed into the secondary winding permits the application of the respective out of phase 50 cycle signals to the base electrodes 38 and 39. These signals thereby alternately bias the transistors 78 and 79 into a conducting condition, after each successful splice has sufficiently lowered the base lead impedance. The transistors 78 and 79 each apply a signal during its conduction period, via a coupling amplifier circuit 86 to the audio output circuit 90. It can be seen from the foregoing that as each splice is completed on the tip and ring side of the conductor pair the transistor 78 or 79 associated with that side will transmit a 50 c.p.s. signal to the audio output circuit 90. Should a tip side be inadvertently spliced with a ring side no signal will be transmitted because the reflected impedance level will not be lowered. A coupling amplifier 86 is inserted for the purpose of isolating direct-current signal levels of the splice checking circuit from the audio output circuit 90 as these signals might alter its bias level.

The audio output circuit 90 may comprise a transistor amplifier device 81 with a resonant oscillating circuit 83 connected in the base circuit 82 of the transistor. The correct polarity connection of the two terminal clips 11 and 21 to the respective conductor pairs 12 and 22 initially causes the direct-current amplifier to apply a signal, via lead 84, to the oscillating circuit 83 which is included in the base circuit of transistor 81. The oscillator circuit 83 comprises an inductor 85 and two series connected capacitors 87 and 89. The direct-current signal energizes the oscillation circuit 83 causing it to oscillate at its resonant frequency. The direct-current level is such that it permits the operation of the transistor 81 at the resonant frequency of the oscillating circuit.

The output signals of the splice checking circuit 80 are applied, via a coupling amplifier 86, to the node 88 of the oscillating circuit 83. The node 88 is interposed between two series connected capacitors 87 and 89. The splice check circuit signals, when applied to the oscillating circuit 83 in the base circuit 82, bias the transistor 81 to a level at which it is no longer in a conducting condition. This biasing effect by interrupting the oscillating signal output of the transistor 81 modulates its output. Since each of the transistors 78 and 79 generates a signal at 50 c.p.s. respectively 180 degrees out of phase as each splice is completed, the output of the audio output circuit 90 will be modulated at first by 50 c.p.s. and finally by 100 c.p.s. when both splices are complete. The output of the audio oscillator may be applied, via lead 91, to some signaling device means 91 which, for illustrative purposes, is assumed to comprise an electromechanical transducer. It is to be understood that some form of visual indicator means would be equally suitable.

When the workman at the field location has completed splicing both the tip and ring sides of the replacement conductor pairs 22 he removes the two terminal clips 11 and 21 from the conductor pairs. The 50 cycle signal output of the low frequency signal generator 19 is still applied to the phase comparison circuit 30 via the auxiliary transmission path 70. It is seen from the foregoing that the mere removal of the terminal clips 11 and 21 will not release the relay 53. The distributed capacitance of the multiconductor cables 13 and 23, however, presents a substantial output impedance load to the high frequency signal output of the signal generator 16. When the test set is disconnected from the cable, the signal level of the generator 16 increases substantially. This signal level increase is detected by the level detector circuit 46 which in response thereto generates an output which is representative of a binary "1".

The signal output of the level detector 46, which is representative of a binary "1" is applied to an inverter circuit 48, which converts it to a signal representative of a binary "0". The binary "0" is applied to one of the inputs of the AND gate 49. The output of amplifier 51 simultaneously applies a signal representative of a binary "1" to the other input of the AND gate 49. The AND gate 49 in response to the anticoincidence of signals applied to its inputs applies a binary "0" to the inverter 54 which converts it to a signal representative of a binary "1". This binary "1" is applied, via lead 56, to one of the inputs of the AND gate 55.

Inasmuch as amplifier 34 is still active, a signal representative of a binary "1" is applied to one of the inputs of AND gate 41. The condition of the logic circuit 40 is presently such that a binary "1" signal exists at node 42 which is applied, via lead 59, to the other input of AND gate 41. The coincidence of input signals permits the AND gate 41 to transmit a binary "1" which is converted by the inverter 43 to a binary "0". The application of the binary "0" to one of the inputs of AND gate 44 limits its output to that of a binary "0" which is applied unchanged to one of the inputs of AND gate 61. The output of AND gate 61 is converted by the inverter 62 into a binary "1" which is applied to the other input of AND gate 55.

The coincidence of signals representing a binary "1" applied to AND gate 55 permits it to transmit a binary "1." This signal is converted by the inverter 64 into one representative of a binary "0" which, applied to the amplifier 51, permits the de-energization of the relay coil 53. The de-energization of the relay coil releases the relay contacts 66 and 67 thereby removing the auxiliary transmission path 70 from service. The de-energization also permits the closing of the relay contact 18 which permits the direct reapplication of the high frequency signal output of the signal generator 16 to the level detector 46, thereby maintaining its output at its present state.

The opening of the auxiliary transmission path 70 disables the application of the low frequency signal to the comparison circuit 30 and hence a signal representative of a binary "0" is applied to the input of AND gate 41. The output of AND gate 41 is converted by inverter circuit 43 to a signal representative of a binary "0' 'which, in turn, is applied to the input of AND gate 44. The signal to the other input of AND gate 44, as seen above, is also a binary "1" applied via lead 57. Consequently, the state of the logic circuit at node 42 becomes representative of a binary "0," its quiescent state. The logic circuit 40 is now in its proper state for the initiation of a subsequent cable splicing operation.

An auxiliary test circuit 92 is included in the test apparatus to enable the workman to check the operation of the apparatus as he desires, or to reset the test apparatus to its initial condition should some unusual condition occur. A four circuit push-button switch 98 enables the connection of an impedance array simulating the parallel existing replacement cables 13 and 23 on the normally disconnected side of the switch. The impedance array comprises a series connected resistor 94 and 95 in both tip and ring sides and a resistor 96 crosscoupling the tip and ring sides. The sizes of the resistors are chosen to give an attenuation equal to that of the multiconductor cable loop to be tested. A capacitor 97 joins the tip side of the crosscoupling resistor to ground and is chosen to equal approximately the distributed capacities that the test apparatus would see in the multiconductor cable loop. The workman activates the test circuit by depressing the pushbutton switch 98 and if the test apparatus is satisfactory it will give an output signal in the output signaling device 93.

A feature of the invention described above is that if at any time after the relay 53 has operated the tip and ring conductors are short circuited, the test set will respond by shutting off the audio output circuit 90. During this time, the relay 53 remains operated. The transmission of signals through the auxiliary transmission path 70 is temporarily halted because they are attenuated by the short circuit. However, because the relay 53 remains operated, when the short circuit is removed, transmission through the auxiliary transmission path 70 will resume. The audio output circuit 91 will also resume operation when the short circuit is removed.

It is to be understood that the above-described apparatus is simply illustrative of the application of the principles of the invention. Numerous other arrangements may be readily devised by those skilled in the art, which will embody the principles of the invention and fall within the spirit and scope thereof.

What is claimed is:

1. Apparatus to facilitate an interchange of multiconductor cables comprising a first multiconductor cable comprising a plurality of conductor pairs having tip and ring leads, a second multiconductor cable comprising a plurality of conductor pairs having tip and ring leads, said first and second cables joining a central office to some field location, means to connect in parallel the individual tip and ring leads of corresponding conductor pairs of said first and second cable at said central office, first probe means to apply a low frequency signal with a predetermined phase to one of said conductor pairs in said first cable at said field location, second probe means at said field location to detect said signal on the corresponding ones of said conductor pairs in said second cable, means to compare the respective phase of said low frequency signal as transmitted and received, means to indicate the results of said phase comparison to the apparatus user, means to enable a substitute electrical path comprising an auxiliary conductor pair having a tip and ring lead interconnecting said first and second probe means in response to the phase coincidence of said transmitted and received low frequency signals, and means to detect an impedance level of the splicing of said second cable into said first cable including means to indicate said impedance level to the apparatus user.

2. The apparatus in claim 1 further including means to generate a nonaudible identification signal to be utilized in determining corresponding conductor pairs of said first and second cables, and means to attenuate said identification signal when said first probe means and said second probe means are properly connected to said first and second cables.

3. The apparatus in claim 1 further including means to check the correct operation of the apparatus in the absence of said first and second cables.

4. The apparatus in claim 1 wherein said means to detect an impedance level includes means to individually check the tip and ring leads of said spliced conductors, and means to disable said substitute path upon the completion of said splice.

5. Cable transfer apparatus comprising a first multiconductor cable comprising a plurality of conductor pairs having tip and ring leads, a second multiconductor cable comprising a plurality of conductor pairs having tip and ring leads, said first and second cables joining the same two terminals respectively, the individual tip and ring leads of the conductor pairs of said first and second cables being connected together in parallel at one of said terminals, means to identify corresponding conductor pairs connected in parallel at said one of said terminals at the other one of said terminals, means to identify the tip and ring leads of each of said corresponding conductor pairs, means to provide an alternate transmission path having tip and ring leads from said first to said second cable at the other one of said terminals only if the tip and ring leads of said corresponding conductor pairs are properly connected to the cable transfer apparatus, means to monitor the impedance of the splicing of the conductor pairs of said first cable to the conductor pairs of said second cable, and means to disable said alternate transmission path upon the successful completion of said splice, said disabling means comprising high frequency signal generation means connected to said first cable and means responsive to an increased signal level when said first cable is disconnected from the cable transfer apparatus.

6. Cable transfer apparatus as claimed in claim 5 wherein said means to provide an alternate transmission path includes means to attenuate an output signal of said means to identify the tip and ring leads of corresponding conductor pairs, said means to identify corresponding conductors including means to apply an alternating signal to a conductor pair of said first cable and means to receive said alternating signal on the corresponding conductor pair of said second cable, means to compare the phase of said alternating signal as transmitted and received, and means to generate an audio output signal if said compared phases correspond.

7. Cable transfer apparatus as claimed in claim 5 wherein said means to monitor the impedance includes a first and a second amplifying device, first means to couple the tip lead of said alternate transmission path to a control electrode of said first amplifying device, second means to couple the ring lead of said alternate transmission path to a control electrode of said second amplifying device, means to apply a first alternating signal to the control electrode of said first amplifying device, means to apply a second alternating signal to the control electrode of said second amplifying device, said first and second signals being 180° out of phase with each other, said first and second amplifying devices being biased to respond to said first and second signals when the reflected impedance transmitted via said first and second coupling means is below a preselected threshold value, and signaling means responsive to periods of conduction of said first and second amplifying device.

8. In combination, a first multiconductor cable including a plurality of conductor pairs each including tip and ring leads, a second multiconductor cable including a plurality of conductor pairs each including tip and ring leads, said first and second cables each joining a near and a far end, the conductor pairs of said first and second cables being connected in parallel at said near end, first probe connection means to apply an alternating signal to a selected conductor pair of said first cable at said far end, second probe connection means to receive at said far end said alternating signal on a conductor pair connected in parallel to said selected conductor pair, means to compare the phases of said alternating signal as applied and received, means to enable an auxiliary transmission path upon the coincidence of the phases of said applied and received signals, said auxiliary transmission path comprising an auxiliary conductor pair interconnecting said selected conductor pair and said conductor pair connected in parallel to said selected conductor pair, means to monitor a splicing of said conductor pair of said second cable onto said conductor pair of said first cable and communicate an indication of the impedance level of said splicing, and means responsive to the disconnection of said first and second probe connection means from said first and second cables to disable said auxiliary transmission path.

9. Apparatus as claimed in claim 8 wherein the disabling means includes means to reset said apparatus for a subsequent cable splicing operation.

10. Apparatus to test respective phase connections of corresponding conductor pairs comprising a first multiconductor cable joining a near to a far end, a second multiconductor cable joining the same near end to the same far end, said first and second multiconductor cables each comprising a plurality of conductor pairs, each of said conductor pairs including a tip and ring lead, means to connect the tip and ring leads of corresponding individual conductor pairs of said first and second cables at said near end in a parallel connection, first probe means to apply a low frequency signal of known phase to a selected conductor pair of said first cable at said far end, second probe means to recover said low frequency signal at said far end on the corresponding conductor pair of said second cable, means to compare the phase of said applied and recovered signals and generate a signal upon agreement therebetween, means to utilize said generated signal to activate an auxiliary path for subscriber signals during the period that service is being transferred from said first to said second cable, said auxiliary path interconnecting the tip and ring leads of said selected and said corresponding conductor pairs, means to monitor the splicing of the first and second multiconductor cables and indicate the success or failure thereof and means to disable said auxiliary path upon the completion of said successful splice, said disabling means including means responsive to the disconnection of said first and second multiconductor cables from said apparatus.

11. Apparatus described in claim 10 further including a high frequency signal source, and means to attenuate said high frequency signal source upon the proper connection of said first and second probe means.

12. In combination, a first multiconductor cable interconnecting a central office to a field location comprising a plurality of pairs of conductors designated as tip and ring, a second multiconductor cable comprising a plurality of pairs of conductors designated as tip and ring, means to connect the respective pairs of said first and second cables in parallel at said central office end, means to generate a first frequency signal, first probe means to apply said first frequency signal to said first cable at the field end to energize an arbitrarily selected one of said pairs of conductors, second probe means to examine the tip and ring conductors of said pairs of said second cable for said applied first frequency signal, means to apply a second frequency signal of lower frequency than said first frequency to the pair of said second cable corresponding to said arbitrarily selected pair, means to compare the respective phases of said second frequency signal as transmitted and received, said comparing means producing an audible tone if the phases coincide, and means to enable the transmission of signals from said first probe means to said second probe means during the period when the first cable is severed and the second cable is being spliced in its place, said enabling means including means to determine the completion of the splice and provide an audible indication thereof.

References Cited

UNITED STATES PATENTS

| | | | |
|---|---|---|---|
| 2,799,739 | 7/1957 | Lowman et al. | 324—66 X |
| 2,869,077 | 1/1959 | Houk | 324—66 |
| 3,252,088 | 5/1966 | Palmer | 324—66 |

RUDOLPH V. ROLINEC, *Primary Examiner.*

G. R. STRECKER, *Assistant Examiner.*